(12) United States Patent
Mughal et al.

(10) Patent No.: US 8,904,232 B2
(45) Date of Patent: Dec. 2, 2014

(54) PREVENTING AUDIT LOSS FOR ASYNCHRONOUS TARGET

(75) Inventors: Zubair Ahmed Mughal, Bellevue, WA (US); Jack S. Richins, Bothell, WA (US); Jerome R. Halmans, Monroe, WA (US)

(73) Assignee: Microsoft Corporation, Redmond, WA (US)

( * ) Notice: Subject to any disclaimer, the term of this patent is extended or adjusted under 35 U.S.C. 154(b) by 276 days.

(21) Appl. No.: 13/459,263

(22) Filed: Apr. 30, 2012

(65) Prior Publication Data

US 2013/0290779 A1    Oct. 31, 2013

(51) Int. Cl.
*G06F 11/00* (2006.01)

(52) U.S. Cl.
USPC ............................ 714/15; 714/6.32

(58) Field of Classification Search
USPC ........................................... 714/15
See application file for complete search history.

(56) References Cited

U.S. PATENT DOCUMENTS

| | | | |
|---|---|---|---|
| 5,325,519 A | | 6/1994 | Long et al. |
| 5,561,795 A | | 10/1996 | Sarkar |
| 5,590,274 A | * | 12/1996 | Skarpelos et al. ........... 714/6.32 |
| 5,682,527 A | * | 10/1997 | Cooper et al. ........................ 1/1 |
| 6,134,664 A | * | 10/2000 | Walker ............................. 726/22 |
| 6,324,548 B1 | | 11/2001 | Sorenson |
| 6,782,399 B2 | | 8/2004 | Mosher, Jr. |
| 6,868,406 B1 | | 3/2005 | Ogg et al. |
| 7,810,142 B2 | | 10/2010 | Agrawal et al. |
| 8,069,148 B2 | | 11/2011 | Richins et al. |
| 2005/0193043 A1 | * | 9/2005 | Hoover ........................... 707/204 |
| 2011/0246817 A1 | * | 10/2011 | Orsini et al. ................... 714/6.1 |
| 2012/0005542 A1 | * | 1/2012 | Petersen et al. ................. 714/48 |
| 2013/0047057 A1 | * | 2/2013 | Resch et al. ................... 714/799 |
| 2013/0227352 A1 | * | 8/2013 | Kumarasamy et al. ...... 714/47.1 |
| 2013/0245820 A1 | * | 9/2013 | Osborne et al. ............... 700/236 |

OTHER PUBLICATIONS

Wasserman, Ted J. "DB2 UDB security, Part 5: Understand the DB2 audit facility", Retrieved at <<http://www.ibm.com/developerworks/data/library/techarticle/dm-0603wasserman/>>, Mar. 9, 2006, pp. 14.

Lee, et al., "Auditing in SQL Server 2008", Retrieved at <<http://msdn.microsoft.com/en-us/library/dd392015(v=sql.100).aspx>>, Feb. 2009, pp. 22.

* cited by examiner

*Primary Examiner* — Kamini Patel
(74) *Attorney, Agent, or Firm* — Nicholas Chen; Kate Drakos; Micky Minhas

(57) ABSTRACT

Aspects of the subject matter described herein relate to auditing operations. In aspects, operations may be audited synchronously and/or asynchronously to one or more audit targets. When auditing synchronously, audit records may be written synchronously to an audit target. When auditing asynchronously, a buffer may be used to store audit records until the audit records are flushed to an audit target. If an error occurs in auditing, a policy may be evaluated to determine how to respond. One exemplary response includes failing an operation that triggered a subsequent audit record. Furthermore, if a buffer was unable to be copied to an audit target, the contents of the buffer may be preserved and one or more retries may be attempted to copy the buffer to the audit target.

16 Claims, 6 Drawing Sheets

PREVENTING AUDIT LOSS FOR ASYNCHRONOUS TARGET

BACKGROUND

Some organizations like to know when users are interacting with certain data. For example, an organization may desire to know what operations a user has issued for a payroll table of a database. To capture an operation issued by a user, an audit record may be created. To prevent loss of the audit record, a system may require that the audit record be stored in persistent storage before allowing the access request to proceed. An error may occur when storing an audit record in persistent storage which may cause the audit record to go non-recorded.

The subject matter claimed herein is not limited to embodiments that solve any disadvantages or that operate only in environments such as those described above. Rather, this background is only provided to illustrate one exemplary technology area where some embodiments described, herein may be practiced.

SUMMARY

Briefly, aspects of the subject matter described herein relate to audition. In aspects, operations may be audited synchronously and/or asynchronously to one or more audit targets. When auditing synchronously, audit records may be written synchronously to an audit target. When auditing asynchronously, a buffer may be used to store audit records until the audit records are flushed to an audit target. If an error occurs in auditing, a policy may be evaluated to determine now to respond. One exemplary response includes failing an operation that triggered a subsequent audit record. Furthermore, if a buffer was unable to be copied to an audit target, the contents of the buffer may be preserved and one or more retries may be attempted to copy the buffer to the audit target.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment."

As used herein, terms such as "a," "an," and "the" are inclusive of one or more of the indicated item or action. In particular, in the claims a reference to an item generally means at least one such item is present and a reference to an action means at least one instance of the action is performed.

Sometimes herein the terms "first", "second", "third" and so forth may be used. Without additional context, the use of these terms in the claims is not intended to imply an ordering but is rather used for identification purposes. For example, the phrases "first version" and "second version" do not necessarily mean that the first version is the very first version or was created before the second version or even that the first version is requested or operated on before the second version. Rather, these phrases are used to identify different versions.

Headings are for convenience only; information on a given topic may be found outside the section whose heading indicates that topic.

Other definitions, explicit and implicit, may be included below.

Exemplary Operating Environment

Figure 1:
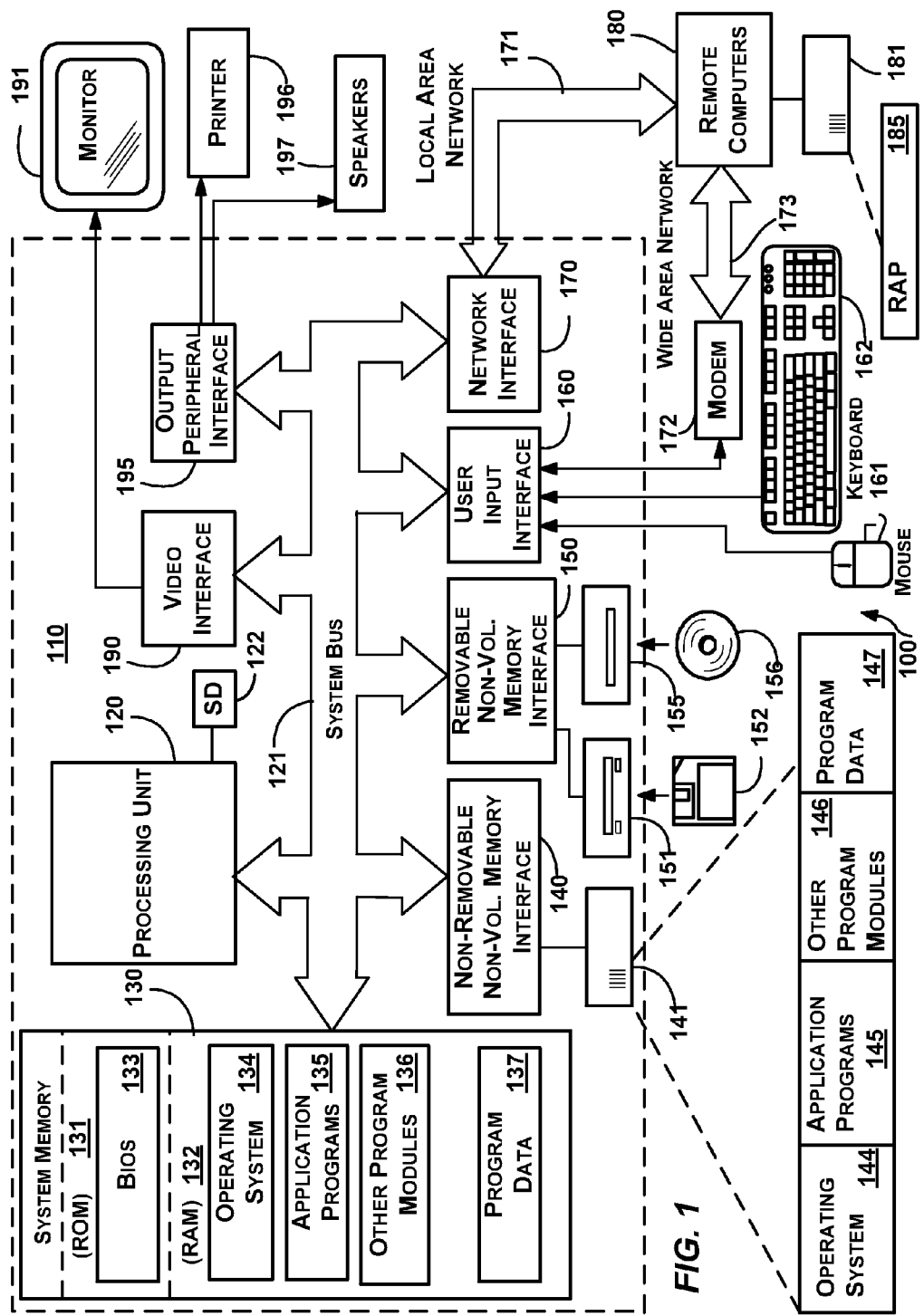
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment, and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well-known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both to and remote computer storage media including memory storage devices.

Alternatively, or in addition, the functionally described herein may be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and the like.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced IS (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The processing unit 120 may be connected to a hardware security device 122. The security device 122 may store and be able to generate cryptographic keys that may be used to secure various aspects of the computer 110. In one embodiment, the security device 122 may comprise a Trusted Platform Module (TPM) chip, TPM Security Device, or the like.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and non-volatile, removable and non-removable media implemented in any method or technology for storage of information such as computer-readable instructions, data structures, program modules, or other data. Computer storage media includes RAM, ROM, EEPROM, sold state storage, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards and other solid state storage devices, digital versatile discs, other optical discs, digital video tape, solid state RAM, solid state ROM, and the like. The hard disk drive 141 may be connected to the system bus 121 through the interface 140, and magnetic disk drive 151 and optical disc drive 155 may be connected to the system bus 121 by an interface for removable nonvolatile memory such as the interface 150.

The drives and the associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone (e.g., for inputting voice or other audio), joystick, game pad, satellite dish, scanner, a touch-sensitive screen, a writing tablet, a camera (e.g., for inputting gestures or other visual input), or the like. These and other input devices are often connected to the processing unit 120 through a user input interface 160 that is coupled to the system bus, but may be connected by other interface and bus structures, such as a parallel port, game port or a universal serial bus (USB).

Through the use of one or more of the above-identified input devices a Natural User Interface (NUI) may be established. A NUI, may rely on speech recognition, touch and stylus recognition, gesture recognition both on screen and adjacent to the screen, air gestures, head and eye tracking, voice and speech, vision, touch, gestures, machine intelligence, and the like. Some exemplary NUT technology that may be employed to interact, with a user include touch sensitive displays, voice and speech recognition, intention and goal understanding, motion gesture detection using depth cameras (such as stereoscopic camera systems, infrared camera systems, RGB camera systems, and combinations thereof), motion gesture detection using accelerometers/gyroscopes, facial recognition, 3D displays, head, eye, and gaze tracking, immersive augmented reality and virtual reality systems, as well as technologies for sensing brain activity using electric field sensing electrodes (EEG and related methods).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Auditing

As mentioned previously, an organization may desire to track the operations that users issue against the organization's data.

Figure 2:
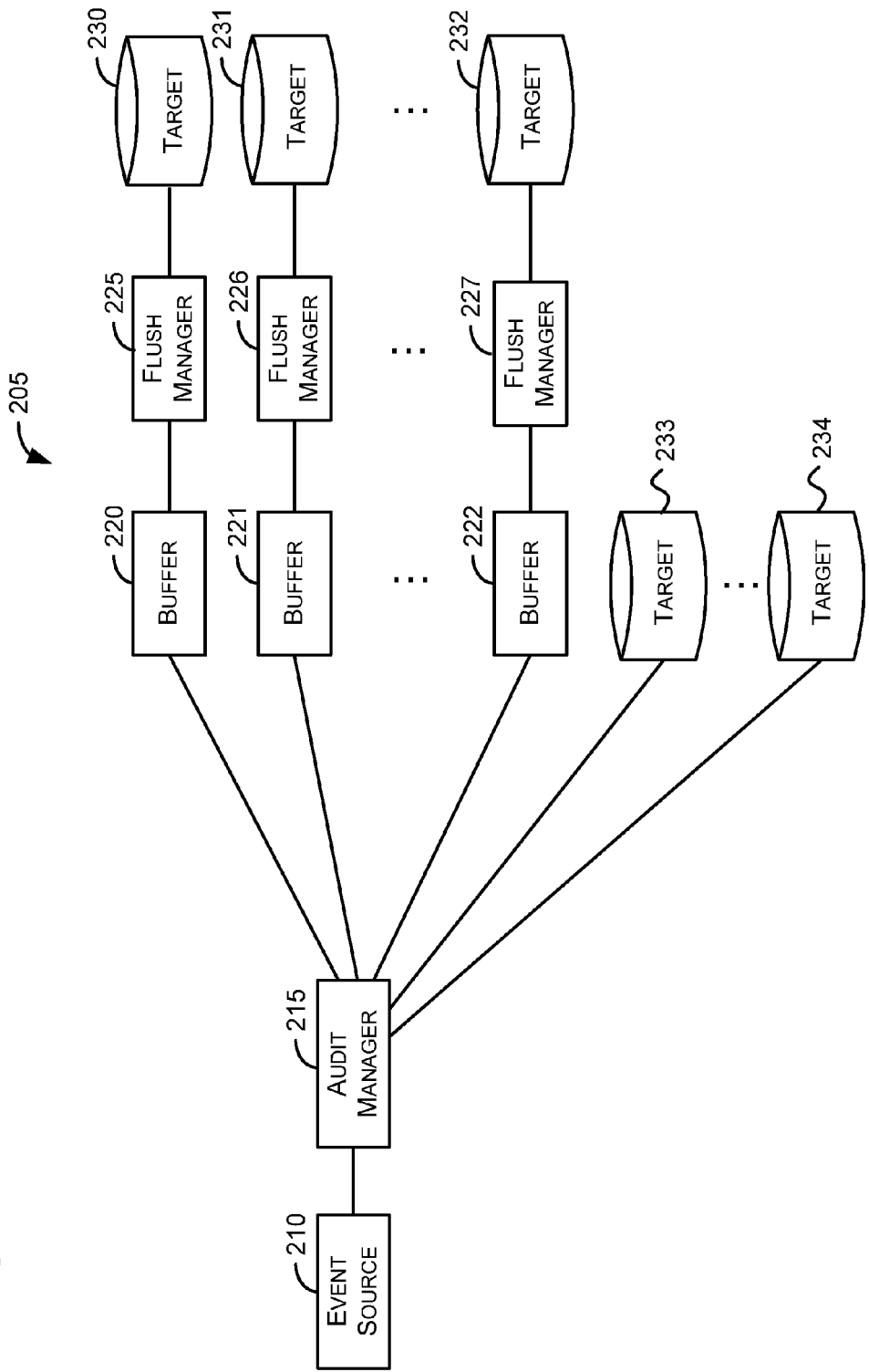
FIG. 2 is a block diagram that represents an exemplary environment in which aspects of the subject matter described herein may operate.

FIG. 2 is a block diagram that represents an exemplary environment in which aspects of the subject matter described herein may operate. The entities illustrated in FIG. 2 are exemplary and are not meant to be all-inclusive of entities that may be needed or included. In other embodiments, the entities and/or functions described in conjunction with FIG. 2 may be included in other entities (shown or not shown) or placed in sub entities without departing from the spirit or scope of aspects of the subject matter described herein. In some embodiments, the entities and/or functions described in conjunction with FIG. 2 may be distributed across multiple devices.

The system 205 may include an event source 210, an audit manager 215, one or more buffers (e.g., the buffers 220-222), one or more flush managers (e.g., the flush managers 225-227), one or more audit targets (e.g., the audit targets 230-234), and other entities (not shown). As used herein, the term entity is to be read to include all or a portion of one or more devices, a collection of one or more software modules or portions thereof, some combination, of one or more software modules or portions thereof and one or more devices or portions thereof, and the like.

One or more of the entities of the system 205 may be implemented by one or more computing devices. Computing devices may include one or more personal computers, server computers, hand-held or laptop devices, multiprocessor systems, microcontroller-based systems, set-top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like. An exemplary device that may be configured to act as one or more of the entities of the system 205 comprises the computer 110 of FIG. 1.

One or more of the entities of the system 205 may be implemented in a virtual environment. A virtual environment is an environment that is simulated or emulated by a computer. The virtual environment may simulate or emulate a physical machine, operating system, set of one or more interfaces, portions of the above, combinations of the above, or the like. When a machine is simulated or emulated, the machine is sometimes called a virtual machine. A virtual machine is a machine that, to software executing on the virtual machine, appears to be a physical machine. The software may save files in a virtual storage device such as virtual hard drive, virtual floppy disk, and the like, may read files from a virtual CD, may communicate via a virtual network adapter, and so forth.

More than one virtual environment may be hosted on a single computer. That is, two or more virtual environments may execute on a single physical computer. To software executing in each virtual environment, the virtual environment appears to have its own resources (e.g., hardware) even though the virtual environments hosted on a single computer may physically share one or more physical devices with each other and with the hosting operating system.

The event source 210 may include a component that indicates data that is to be audited. For example, the event source 210 may comprise a software module that collects user name, timestamp, operation issued, data source to which the operation was issued, and the like. For example, the event source 210 may indicate that a user Hyrum issued a select statement against a payroll table at 12:30 p.m. on Apr. 2, 2012.

In an embodiment that involves synchronous auditing, the audit manager 215 may store an audit record directly to an audit target or may use a buffer and ensure that an attempt is made to copy the audit record to the audit target before proceeding. For example, if the audit manager 215 is configured to synchronously store audit records, upon receiving an event from the event source 210, the audit manager 215 may store an audit record in an audit target prior to responding to the event source 210 that the audit record has been stored. In this embodiment, there is no need for a buffer between the audit manager 215 and the audit target, but a buffer may be used to simplify implementation, for example. This is illustrated by the audit targets 233-234

In another embodiment that involves asynchronous auditing, the audit manager 215 may store audit records in a buffer. After storing an audit record in the buffer and prior to the audit record being copied to an audit target, the audit manager 215 may indicate to the event source 210 that an audit record has been written and allow the operation that triggered the audit record to proceed. This potential delay in writing the audit record from the buffer to the audit target while allowing the operation that triggered the audit record to proceed is what is meant by asynchronous auditing.

An audit manager 215 may generate audit records for one or more audit targets. For example, where the audit manager 215 is configured to generate audit records for a single audit target, only one buffer, flush manager, and audit target may be needed.

Where the audit manager 215 is generating audit records for multiple audit targets, the audit manager 215 may operate synchronously and/or asynchronously depending on policies associated with the audit targets. For example, if policy indicates that the audit targets 233-234 are to be written to synchronously while other policies indicate that the targets 231-232 are to be written to asynchronously, the audit manager 215 may write an audit record directly to the audit target 233 and wait until the audit record is successfully written before indicating that the audit record has been written. In addition, the audit manager 215 may write audit records to the buffers 220-222 and indicate that the audit records have been written prior to the audit records actually being copied to the targets 230-232.

For asynchronous auditing, the audit manager 215 may comprise a component that creates an audit record and attempts to store the audit record in one or more buffers. For example, the audit manager 215 may create a data structure that includes data that indicates username, timestamp, operation issued, data source to which the operation was issued, and the like. The audit manager 215 may then cause this data structure to be stored in one or more buffers (e.g., the buffers 220-222).

The buffers 220-222 may comprise data stores that store data prior to copying the data to a persistent audit target. In one embodiment, the buffers 220-222 may comprise in-memory storage elements (e.g., RAM) that are volatile. In another embodiment, the buffers 220-222 may comprise non-volatile storage or a combination of volatile and nonvolatile storage.

There may be one or more buffers. Each buffer may be associated with a different audit target. A buffer may store one or more audit records. A buffer may be omitted for audit targets that are written to synchronously.

Upon a triggering event, a flush manager may attempt to copy audit records from the buffer to the buffer's associated and target. Some exemplary triggering events include when a buffer is full, when a threshold (e.g., a space consumed threshold) is crossed for storing audit records, at periodic time intervals, at other times, and the like. In conjunction with copying audit records, a flush manager may purge, delete, mark for deletion, or take other actions to free space occupied in the buffer by the audit records that are copied to the audit target.

If a flush manager is unsuccessful in copying an audit record to an audit target, the flush manager may perform additional actions that are described in more detail below.

The audit targets 230-232 are data stores that are operable to store the data of audit records. The audit targets 230-232 may include any storage media capable of providing access to data of the audit records. Access as used herein may include reading data, writing data, deleting data, updating data, a combination including two or more of the above, and the like. An audit target may comprise hard disk storage, other non-volatile storage, volatile memory such as RAM, other storage, some combination of the above, and the like and may be distributed across multiple devices. The audit targets 230-232 may be external, internal, or include components that are both internal and external to entities that host other components of the system 205.

The term data is to be read broadly to include anything that may be represented by one or more computer storage elements. Logically, data may be represented as a series of 1's and 0's in volatile or non-volatile memory. In computers that have a non-binary storage medium, data may be represented according to the capabilities of the storage medium. Data may be organized into different types of data structures including simple data types such as numbers, letters, and the like, hierarchical, linked, or other related data types, data structures that include multiple other data structures or simple data types, and the like. Some examples of data include information, program code, program state, program data, other data, and the like.

In one embodiment, the audit targets 230-232 are outside of the control of users or administrators of the other entities of the system 205. This may be done, for example, to ensure that the audit records of the audit targets 230-232 are not tampered with by unauthorized users.

If a flush manager is unable to copy an audit record from a buffer to the buffer's corresponding audit target, the flush manager may, depending on policy, behave in different manners. Some exemplary policies include ignore, shutdown, and fail operation.

If a policy indicates ignore and a failure occurs in copying, entries in the buffer may be deleted, marked for deletion, overwritten, or otherwise disposed of and the audit manager 215 may continue to generate and write audit records to the buffer.

If a policy indicates shutdown, a server providing access to audited data may be shut down to prevent any additional access to the audited data until auditing problems are corrected.

If the policy indicates fail operation, the flush manager may indicate an error to the audit manager 215. Until the error is cleared, the audit manager 215 may not allow any additional audit data to be stored in the buffer. The audit manager 215 may also cause operations for which audit data would be generated to fail. For example, if a policy indicates that audit records are to be generated for selects issued against a table, the audit manager 215 may fail a select issued against the table if a flush manager has previously indicated a state of error in copying audit records.

When there are multiple audit targets, the audit manager may respond to a failure to copy to one or more of the targets depending on policies associated with the targets. For example, if all failed copy operations occur for targets associated with an ignore policy, the audit manager 215 may ignore the failure(s). As another example, if one or more of the failed copy operations occurs for a target associated with a fail operation policy, the audit manager 215 may cause an in-progress operation to fail.

For a more concrete example, referring to FIG. 2, if the flush manager 225 was not able to copy an audit record from the buffer 220 to the audit target 230 and the policy is ignore, this, by itself does not cause the audit manager 215 to fail an operation. If, however, the flush manager 226 failed to copy an audit record from the buffer to the audit target 231 and policy is fail operation, this does cause the audit manager to fall an operation for which auditing is sought.

When the audit manager 215 attempts to audit an operation, whether the audit manager writes an audit record to a buffer depends on policy and potentially the state of copying audit records from the buffer to the audit target associated with the buffer. If the policy is ignore, the audit manager 215 may write the audit record to the buffer even if the last flush failed. If the policy is fail operation and the last flush failed, the audit manager 215 may not attempt to write an audit record to the buffer.

Where there are multiple audit targets, the audit manager 215 evaluates the policy and state associated with each audit target. The audit manager 215 writes or does not write to a buffer based on the conditions indicated above, but in one embodiment, the audit manager 215 cycles through all audit targets to determine whether to write an audit record to a buffer rather than stopping at a particular buffer if a fail operation and error state is encountered.

For example, if the policy associated with the buffer 220 is ignore and an error state is associated with the buffer 220, the audit manager 215 may still write an audit record to the buffer 220. If policy associated with the buffer 221 is fail operation and an error state is associated with the buffer 221, the audit manager 215 may not write an audit record to the buffer 221, but the audit manager 215 may still examine the remaining buffer(s) (e.g., the buffer 222) to determine whether to write the audit record to the remaining buffer(s). If the policy associated with the remaining buffer is fail operation but there is no error state associated with the remaining buffer, the audit manager 215 may write an audit record to the remaining buffer.

For one or more policies when a buffer is in an error state, a flush manager may try again to copy audit records that have not already been copied from the buffer to an audit target. For example, for a fail operation policy associated with a buffer in an error state, the flush manager may retry copying non-copied audit records from the buffer to the audit target. If the flush manager is successful, it may then clear the error state. If the flush manager is not successful, it may evaluate how many attempts to copy are to be tried and whether the requisite number of attempts has been reached. If the number has not been reached, the flush manager may wait for a configurable amount of time and again retry to copy non-copied audit records until, the number of times has been reached with failure or until all audit records are copied to the audit target. If the latter case is achieved, the flush manager may clear the error state which allows the audit manager 215 to write audit records to the buffer.

Where the audit manager 215 is dealing with a synchronous audit target, in attempting to write an audit record to an audit target, the audit manager 215 may wait until the write succeeds or fails before taking additional action. If the write fails, the audit manager 215 may fail the operation if the policy so dictates. If another operation is issued that needs to be audited, the audit manager 215 may again attempt to write to the synchronous audit target even though the last attempt was unsuccessful. If writing to the target is successful, the error state associated with the audit target may be cleared.

FIGS. 3-6 are flow diagrams that generally represent exemplary actions that may occur in accordance with aspects of the subject matter described herein. For simplicity of explanation, the methodology described in conjunction with FIGS. 3-6 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement toe methodology in accordance with aspects of the subject matter described herein. In addition, those skilled in the art will understand and appreciate that the methodology could alternatively be represented as a series of interrelated states is a state diagram or as events.

Figure 3:
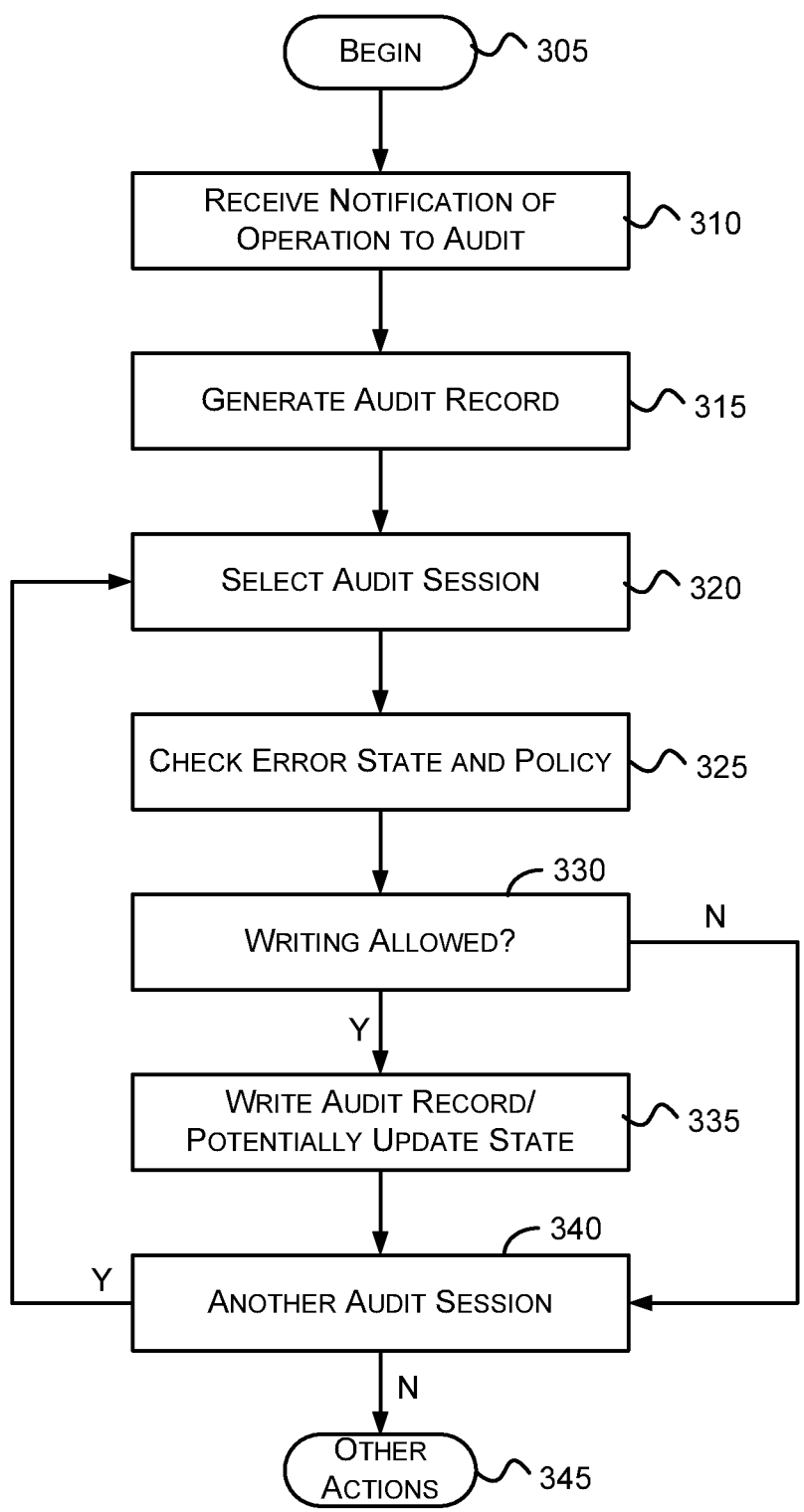
FIG. 3 is a flow diagram that generally represents exemplary actions that may occur in generating and writing an audit record in accordance with aspects of the subject matter described herein.

FIG. 3 is a flow diagram that generally represents exemplary actions that may occur in generating and writing an audit record in accordance with aspects of the subject matter described herein. At block 305, the actions begin.

At block 310, notification is received of an operation to audit. For example, referring to FIG. 2, the audit manager 215 receives notification from the event source 210 of an operation to audit.

At block 315, an audit record is generated. For example, referring to FIG. 2, the audit manager 215 generates an audit record that indicates that a user Hyrum issued a select statement against a payroll table at 12:30 p.m. on Apr. 2, 2012.

At block 320, audit sessions affected by the audit record are determined and an audit session to write the audit record to is selected. For example, referring to FIG. 2, the audit manager 215 may determine the audit sessions affected by the audit record and select one of the audit sessions to which to write the audit record. These audit sessions may be determined by data that indicates what is to be logged where.

The term audit session is used to refer to a set of one or more entities, policies, and state that are involved with an audit target. For a synchronous audit session, the audit session may include the audit target, a policy that indicates what to do on failure to write to the audit target, and state that indicates whether the previous attempt to write to the audit target succeeded. For an asynchronous audit session, the audit session may include a buffer, a flush manager, an audit target, a policy that indicates what to do on failure to write to the audit target, and state that indicates whether the previous attempt to write to the audit target succeeded, and any associated state (e.g., success or failure state as well as what audit records were copied from the buffer to the audit target).

At block 325, error state and policy are checked for the selected session. For example, for an asynchronous audit session, if the audit session is not in an error state, the audit record may be written. If the audit session is in an error state, policy may be checked to determine whether an audit record may be written. If the audit session is in an error state and the policy is fail operation, this triggers failing the operation at block 345. As another example, for a synchronous audit session, even if the audit session is in error, an attempt to write the audit record may still be allowed.

At block 330, if writing is allowed, the actions continue at block 335; otherwise, the actions continue at block 340.

At block 335, an attempt is performed to write an audit record. For example, referring to FIG. 2, the audit manager 215 may attempt to write an audit record to the buffer 220.

In addition, state may be updated in conjunction with writing an audit record. For example, if the audit manager 215 is able to successfully write an audit record to the target 233, state associated with the target 233 may be updated to indicate success. As another example, if the audit manager is not able to successfully write an audit record to the target 234, state associated with the target 233 may be updated to indicate failure. For a synchronous audit session with a fail operation policy, failure to write the audit record to the audit target triggers failing the operation at block 345.

At block 340, a check is made as to whether there is another audit session to which to write the audit record. If so, the actions continue at block 320 where another audit session is selected. For example, referring to FIG. 2, after writing to the buffer 220, the audit manager 215 may determine that there are still other audit sessions to which to write the audit record.

At block 345, other actions, if any, may be performed. For example, in some instances, a fail operation policy may be applied to fail the operation that triggered auditing. For example, if one or more of the asynchronous audit sessions are in an error state and the policy for at least one of them is fail operation, the operation that triggered auditing is failed. As another example, for synchronous audit sessions, if writing an audit record to at least one audit target failed and the policy for the failed write is fail operation, the operation that triggered auditing is failed.

In one embodiment, checking for error states and policies to determine whether to fail the operation may be performed after all audit sessions have been selected (e.g., at block 345). In another embodiment, checking for error states and policies may be performed in conjunction with other actions mentioned above and a flag set if the operation is to be failed. Then, at block 345, if the flag is set, the operation that trig auditing is failed.

Figure 4:
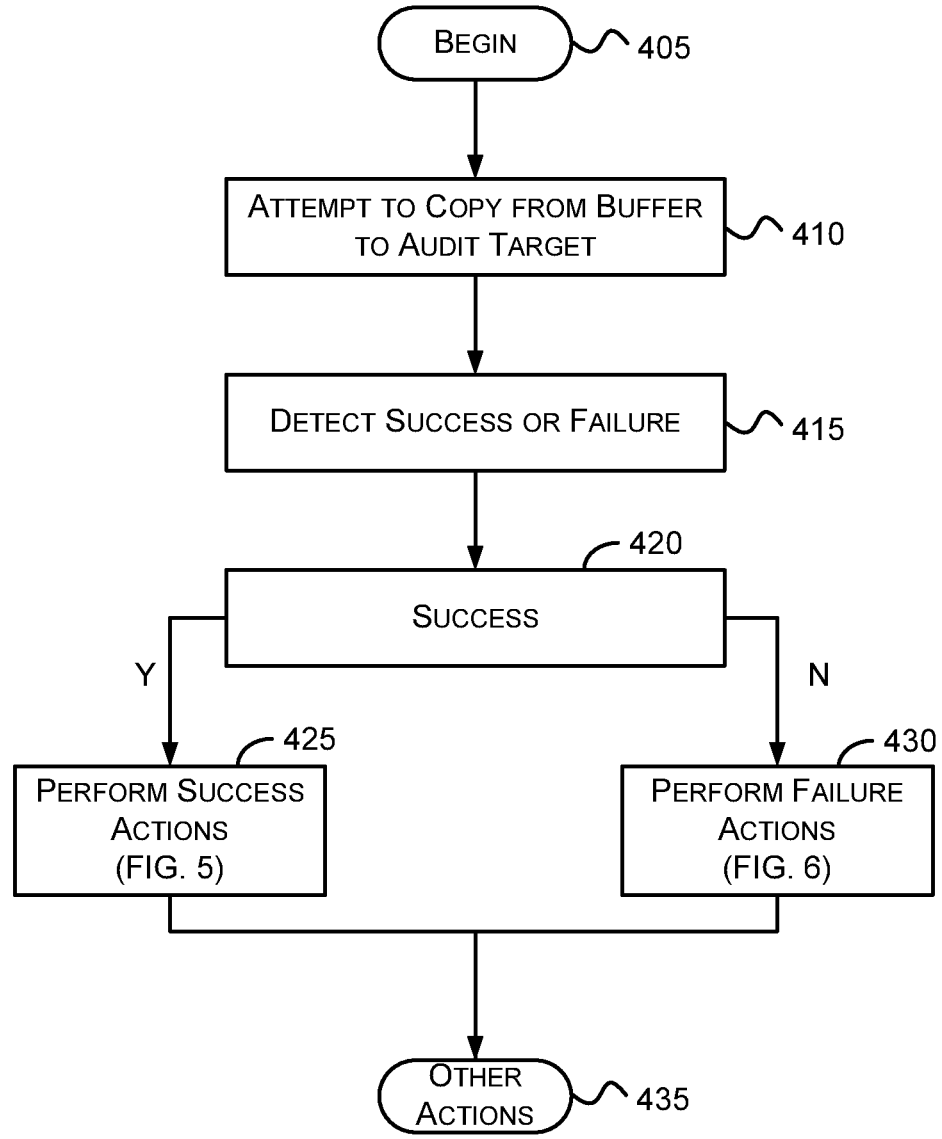
FIG. 4 is a flow diagram that generally represents exemplary actions that may occur when flushing a buffer to an audit target in accordance with aspects of the subject matter described herein.

FIG. 4 is a flow diagram that, generally represents exemplary actions that may occur when flushing a buffer to an audit target in accordance with aspects of the subject matter described herein. At block 405, the actions begin.

At block 410, an attempt is made to copy an audit record from a buffer to an audit target. For example, referring to FIG. 2, the flush manager 225 may attempt to copy an audit record from the buffer 220 to the audit target 230.

At block 415, whether the attempt was successful or failed is detected. For example, referring to FIG. 2, the flush manager 225 may detect whether the attempt to copy an audit record from the buffer 220 to the audit target 230 failed or succeeded by examining a return code of a file system operation.

At block 420, if the operation is successful, the actions continue at block 425; otherwise, the actions continue at block 430.

Figure 5:
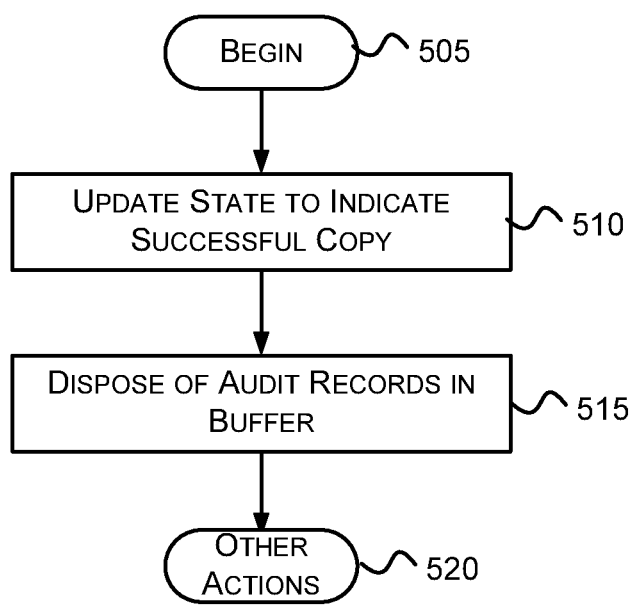
FIG. 5 is a flow diagram that generally represents exemplary actions that may occur when copying from a buffer to an audit target succeeds in accordance with aspects of the subject matter described herein.

At block 425, success actions are performed as described in more detail in conjunction with FIG. 5.

Figure 6:
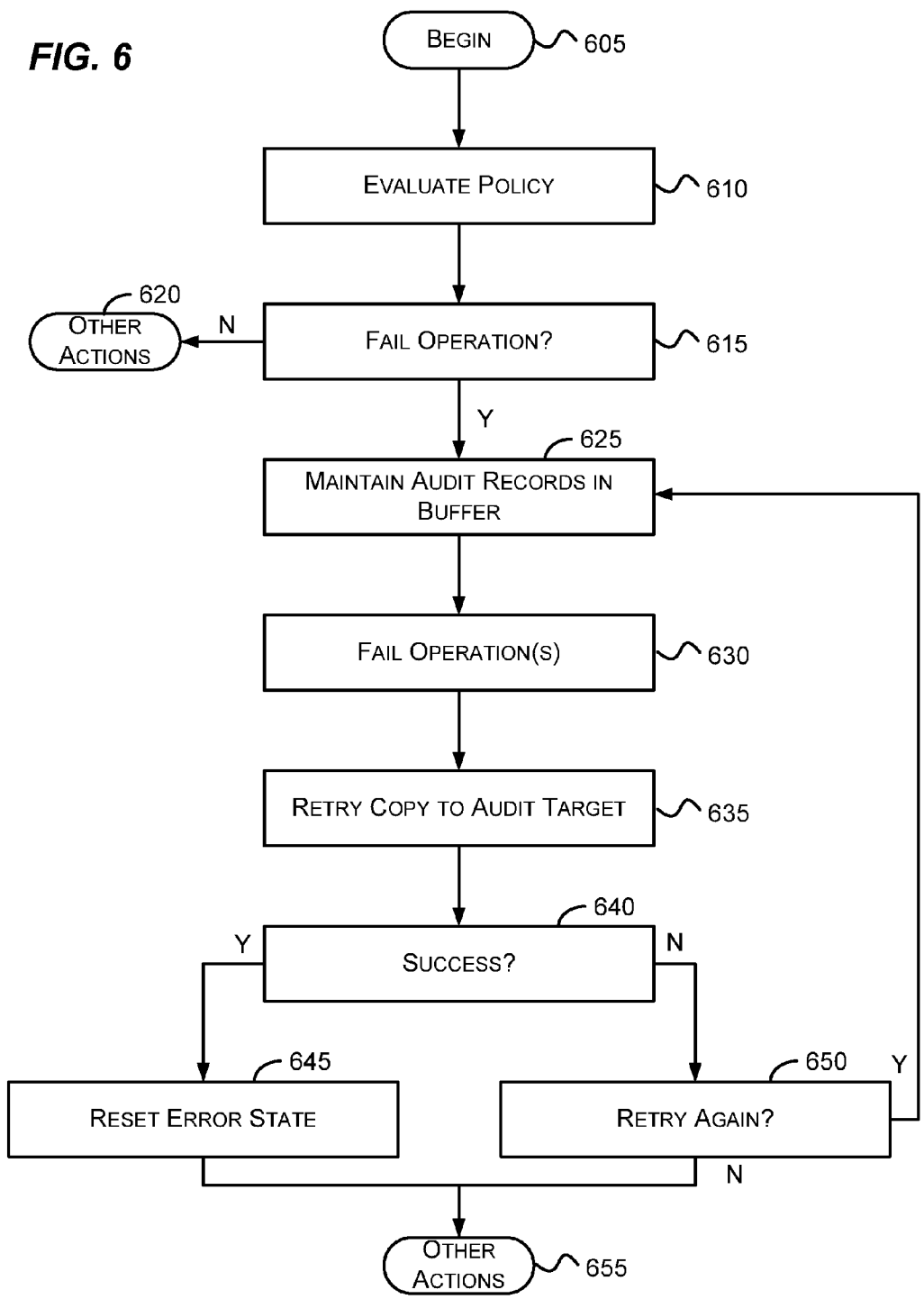
FIG. 6 is a block diagram that generally represents exemplary actions that may occur when copying from a buffer to an audit target fails in accordance with aspects of the subject matter described herein.

At block 430, failure actions are performed as described in more detail in conjunction with FIG. 6.

At block 435, other actions, if any, may be performed.

FIG. 5 is a flow diagram that generally represents exemplary actions that may occur when copying from a buffer to an audit target succeeds in accordance with aspects of the subject matter described herein. At block 505, the actions begin.

At block 510, state may be updated to indicate that audit records from a buffer have been successfully copied to an audit target. For example, referring to FIG. 2, the flush manager 225 may update a state object to indicate that audit records have been successfully copied from the buffer 220 to the target 230.

At block 515, audit records are disposed of. For example, referring to FIG. 2, the flush manager 225 may delete, mark for deletion, or otherwise dispose of records in the buffer 220.

At block 520, other actions, if any, may be performed.

FIG. 6 is a block diagram that generally represents exemplary actions that may occur when copying from a buffer to an audit target fails in accordance with aspects of the subject matter described herein. At blocs 605, the actions begin.

At block 610, a policy associated with the buffer is evaluated. The policy may indicate, for example, ignore, shutdown, or fail operation. For example, referring to FIG. 2, the flush manager 225 may evaluate a policy to determine what to do in the event of failure to copy audit records from the buffer 220 to the audit target 230.

At block 615, if the policy is fail operation, the actions continue at block 625; otherwise, the actions continue at block 620.

At block 620, if the policy is shutdown a server providing access to audited data may be shut down to prevent any additional access to the audited data until auditing problems are corrected. For example, if the policy is ignore, entries in the buffer 220 may be deleted, marked for deletion, overwritten, or otherwise disposed of and the audit manager 215 may continue to generate and write audit records to the buffer 220.

At block 625, audit records are maintained in the buffer. For example, referring to FIG. 2, the audit manager 215 may be informed (e.g., via an error object or message from the flush manager 225) that no more audit records may be written to the buffer 220 until further notice. This ensures that even if the buffer 220 is full that audit records in the buffer 220 will not be overwritten and lost. While the buffer is maintained with its current audit records, there may be one or more retries to write from the buffer 220 to the audit target 230.

At block 630, operations that would have triggered storing audit records in the buffer are failed. Failing an operation may occur at block 345 of FIG. 3 after attempting to write the audit record to all appropriate audit sessions. For example, referring to FIG. 2, when the audit manager 215 receives notification of an operation that would have triggered the audit manager 215 to write an audit record to the buffer 220, the audit manager 215 causes the operation to fail. Failing an operation may include preventing the operation from completing unless and until an audit record is written to the audit target (e.g., synchronous case) or until all non-copied audit records in a buffer are copied to the audit target (e.g., asynchronous case).

At block 635, a retry to copy from the buffer to the audit target is attempted. For example, referring to FIG. 2, the flush manager 225 may retry to copy from the buffer 220 to the audit target 230.

At block 640, if the retry is successful, the actions continue at block 645; otherwise, the actions continue at block 650.

At block 645, the error state 645 is reset to indicate that no error exists with writing from the buffer to the audit target. For example, referring to FIG. 2, the flush manager 225 may reset an error object to indicate that the audit manager 215 may write audit records to the buffer 220.

At block 650, a determination is made as to whether another attempt is to be made to copy audit records from the buffer to the audit target. If so, the actions continue at block 625; otherwise, the actions continue at block 655, perhaps after a time delay. This determination may be made by evaluating a policy applicable to the failure to write to the audit target.

At block 655, other actions, if any, may be performed. For example, referring to FIG. 2, as mentioned previously, even after a failure with one audit session, the audit manager 215 may attempt to write audit records to other audit sessions. Furthermore, audit records may be maintained in a buffer for future attempts even if an immediate retry is not currently in progress.

As can be seen from the foregoing detailed description, aspects have been described related to auditing. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:
   attempting to copy a first audit record from a first buffer to a first audit target;
   detecting a failure to copy the first audit record from the first buffer to the first audit target; and
   in response to the failure to copy the audit record, performing additional actions, comprising:
      maintaining the audit record in the buffer,
      failing subsequent operations that would have triggered storing other audit records in the buffer, and
      performing another attempt to copy the first audit record from the first buffer to the first audit target and;
   receiving notification of an operation that is to be audited;
   generating a second audit record based on the operation;
   attempting to write the second audit record to a second audit target;
   detecting a failure to write the second audit record to the second audit target;
   evaluating a policy applicable to the failure to write the second audit record to the second audit target, the policy indicating to fail the operation if writing an audit record based on the operation to the second audit target fails; and
   in response to the evaluating the policy and the failure to write the second audit record to the second audit target, failing the operation.

2. The method of claim 1, wherein the attempting to copy a first audit record from a first buffer to a first audit target comprises attempting to copy the first audit record from a first buffer that is maintained in volatile memory to a first audit target that is maintained in nonvolatile memory.

3. The method of claim 1, wherein attempting to copy a first audit record from a first buffer to a first audit target comprises attempting to copy a first audit record from a system having a first set of users allowed to access the first audit record to a system having a second set of users allowed to access the first audit record to avoid tampering with the first audit record by a user of the first set of users.

4. The method of claim 1, further wherein failing the operation comprises preventing the operation from completing unless the second audit record is successfully written to the second audit target.

5. The method of claim 1, further comprising:
   attempting to copy a second audit record from a second buffer to a second audit target;
   detecting a failure to copy the second audit record from the second buffer to the second audit target; and
   evaluating a policy applicable to the failure to copy the second audit record from the second buffer to the second audit target, the policy indicating to ignore errors when writing to the second audit target; and
   in response to evaluating the policy, performing additional actions, comprising:
      disposing audit records from the second buffer;
      allowing additional audit records for additional audited operations to be written to the second buffer;
      attempting to copy the additional audit records from the second buffer to the second audit target.

6. The method of claim 1, further comprising, if the another attempt to copy the first audit record from the first buffer to the first audit target fails, evaluating a retry policy to determine whether to perform the additional actions again.

7. The method of claim 1, further comprising attempting to copy an audit record from another buffer to another audit target without regard to the failure to copy the first audit record from the first buffer to the first audit target.

8. The method of claim 1, further comprising receiving an indication of an operation, generating the first audit record based on the operation, storing the first audit record in the first buffer, and allowing the operation to proceed before the attempting to copy the first audit record from the first buffer to the first audit target.

9. The method of claim 8, further comprising verifying that no error is associated with copying audit records from the first buffer to the first audit target before allowing the operation to proceed.

10. The method of claim 1, further comprising evaluating a policy in response to the failure to copy the first audit record from the first buffer to the first audit target, the policy being one of: ignore errors, fail operation on error, and shut down on error.

11. The method of claim 1, further comprising determining whether auditing is to be performed asynchronously or synchronously with respect to an operation to be audited.

12. In a computing environment, a system, comprising:
   a nonvolatile audit target operable to store audit records;
   a volatile buffer operable to store audit records prior to attempting to flushing the audit records to the audit target;
   a flush manager operable to attempt to copy the audit records from the buffer to the audit target, the flush manager further operable to retry copying the audit records from the buffer to the audit target if indicated by a policy and the attempt failed; and
   an audit manager operable to receive an indication of an operation to audit and to evaluate a policy applicable to the failure to write the audit records to the audit target, the policy indicating to fail the operation if writing an audit record based on the operation to the audit target fails, and in response, to generate an audit record and to store the audit record in the buffer based on the policy and whether audit records of the buffer were previously successfully copied to the audit target and is further operable to fail the operation based on the policy if the attempt to copy the audit records from the buffer to the audit target failed.

13. The system of claim 12, wherein the nonvolatile audit target is not accessible by an entity that performed or attempted to perform the operation.

14. The system of claim 12, wherein the audit manager is further operable to attempt to write the audit record to other buffers that are each associated with other audit targets, the audit manager being operable to attempt to write the audit record to the other buffers even if one or more audit targets are in an error state.

15. The system of claim 12, wherein the audit manager is further operable to attempt to write the audit record directly to the audit target if auditing for the audit target is to be performed synchronously.

16. The system of claim 12, wherein the flush manager is further operable to reset an error state of the buffer if the attempt or any retry of copying the audit records from the buffer to the audit target succeeds.

\* \* \* \* \*